July 13, 1926.    1,592,060

R. L. WILCOX

KNOCKOUT MECHANISM

Filed May 19, 1924

Inventor

Richard Lester Wilcox

WITNESS:—
Chas. L. Griesbauer

By George G. Hall
Attorney

Patented July 13, 1926.

1,592,060

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

KNOCKOUT MECHANISM.

Application filed May 19, 1924. Serial No. 714,525.

My invention relates to a new and improved knockout mechanism of the type used upon heading or upsetting machines, although not limited thereto.

It is the object of this invention, among other things, to provide a knockout mechanism, which may be readily adjusted for different lengths of blanks, will be positive in its operation, and maintain constant contact with the source of power mechanism and without undue wear, noise, shock or strain thereon, or to adjacent parts, and in these and in many other ways, to produce a mechanism of this character that will be much more highly efficient than any heretofore provided, have the maximum and a predetermined adjustability, and composed of parts that are simple of construction, and accessible both for either adjustment or replacement.

To these and other ends, my invention consists in the knockout mechanism, having certain details of construction and combinations of parts, as will be hereinafter described, and more particularly pointed out in the claims.

Referring to the drawings, in which like numerals of reference designate like parts in the several figures.

Figure 1:
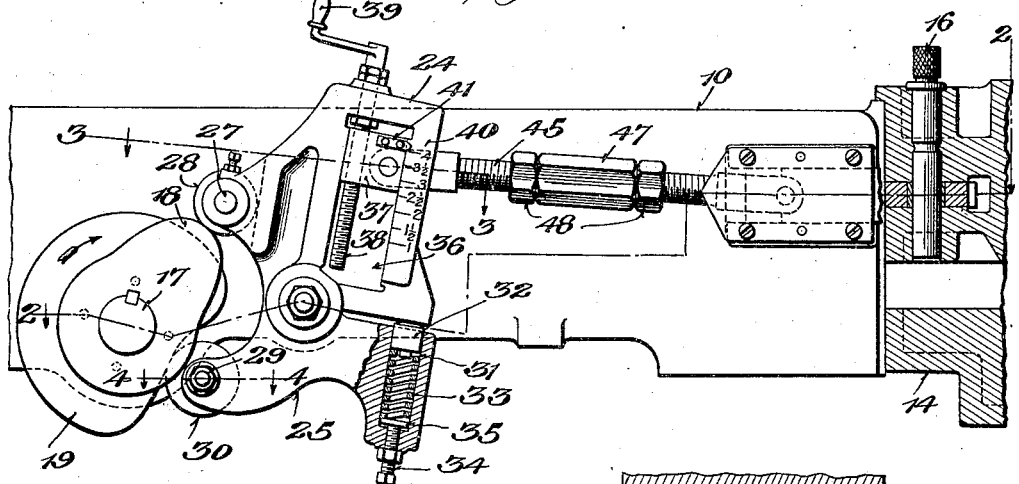
Figure 1 is an elevation of my improved knockout mechanism shown as associated with a header or upsetting machine of a well known type.
Figure 2:
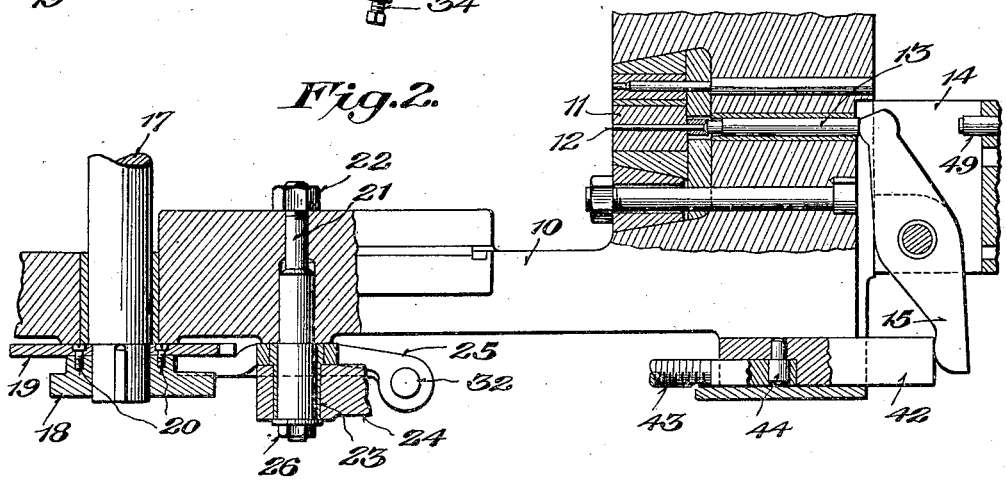
Figure 2 is a plan view thereof, the parts in section being taken generally upon line 2—2 of Figure 1.
Figure 3:
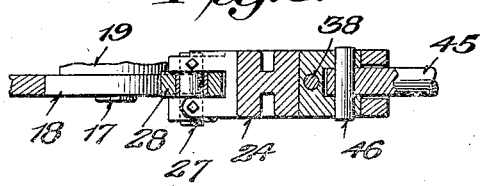
Figure 3 is a detail sectional plan view of a portion of the lever mechanism and some adjacent parts, those in section being taken generally upon line 3—3 of Figure 1.
Figure 4:
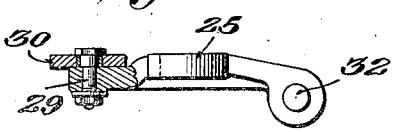
Figure 4 is a detail plan view of the follower cam lever, and adjacent parts, those in section being taken generally upon line 4—4 of Figure 1.

Heretofore knockout mechanism of this general character has been constructed with a single cam, that is, the knockout cam, and the roll upon the knockout lever is held in contact therewith by an arm upon the opposite side of the lever fulcrum and having a tension spring attached thereto and to an adjacent fixed part.

It is designed that this spring should maintain the cam roll in constant contact with the cam. The strain upon the spring, however, is so great that it frequently breaks, causing damage and injury to the parts, and when the machine is running at a relatively high speed the tension of the spring is not sufficient to keep the roll in contact with the cam. This results in the roll leaving the cam and returning thereto with a hammering action or shock, which injures the face of the cam as well as the roll and causes an undue and unnecessary strain and shock upon all of the parts. In addition to this, variation of movement of the knockout mechanism can only be obtained by the slow and unsatisfactory shift and try method, which consumes considerable time, during which the machine is nonproductive, and results in the loss of a substantial amount of stock.

These, and other objections to the knockout mechanisms in the prior art are overcome in my improved mechanism herein shown and described.

In the drawings, 10 designates a portion of the body of a heading or upsetting machine or the like, which may be of any convenient form or type, in one end of which is a die 11, having a knockout pin 12 projecting therethrough in the rear of which is a knockout rod 13.

Mounted in the bracket 14, connected with the body 10, is a knockout lever 15, which is journaled upon a readily removable pin 16 or other suitable means.

The mechanism just described is well known in the art and constitutes no part of my present invention.

Journaled in the body 10, is a shaft 17 having fixed on the outer end thereof a knockout cam 18 and a follower cam 19. These cams are shown as being separate elements but they may in fact be made integral with each other if desired. For convenience in manufacture, and to insure a proper alignment with each other I preferably secure them together by the screws 20 or similar means.

A stud 21 is secured in the body 10 by means of the nut 22, or the like, and upon the outer end thereof is a bushing 23, upon which is journaled the knockout lever 24 and the follower lever 25. A nut 26 upon the stud 21 prevents axial movement of this bushing and both of the levers in one direction.

Fixed in the knockout lever 24 is a stud 27 upon which is rotatably mounted a cam roll 28, which rides against the face of the knockout cam 18.

In the follower lever 25 is a fixed stud 29 having a cam roll 30 mounted thereon which rides against the face of the follower cam 19.

Movably mounted within the bore 31 in the follower lever 25 is a plunger 32, which is projected outwardly by the spring 33 within said bore, the tension of which is varied by means of the screw 34, and between the inner end of which and said spring is a disk or washer 35. As the shaft 17 rotates, an oscillating movement is imparted to the knockout lever 24 through the cam roll 18. As both of the levers 24 and 25 rotate about a common axis, all of the cam rolls are maintained in constant contact with the face of each of the cams through the plunger 32 and spring 33, the tension of which is varied as may be desired to insure proper functioning of the parts relatively to each other.

By this simple and effective mechanism the lever 24 is assured of a proper oscillating movement, and the roll thereon is in constant contact with the knockout cam and there maintained by means of the follower cam and yielding mechanism which latter has such a limited movement that it will always operate uniformly irrespective of the speed of rotation of the cam. By reason of the spring actuated plunger mechanism between the two levers, it is not necessary that the shape of the follower cam 19 should be anything more than approximate, as any irregularity in its shape will be taken up in the spring 33.

In an opening 36 in the lever 24 is a block 37, adjustable in a well known manner through a screw 38 rotated by a crank handle 39. One face of the lever adjacent to the opening 36 is graduated as shown at 40, and preferably marked by figures to indicate various lengths of movement of the knockout mechanism.

Fixed to the block 37 is an indicator finger 41 which registers with these graduations during the movement of the block.

Movably mounted relatively to the body 10 upon one side thereof is a slide 42, the outer end of which travels in the path of movement of the lever 15 and is connected with the block 37 by means of an adjustable connection comprising the threaded rod 43 pivotally connected with the slide 42 by a stud 44 or the like, a threaded rod 45 connected with the block 37 by the pintle 46 or the like, these being joined at their inner ends by a turnbuckle 47 of the usual construction, and held against premature movement by jam nuts 48. Thus an oscillating movement of the knockout lever 24 produces a reciprocatory movement of the slide 42 and a rocking movement to the knockout lever 15, and a straight forward movement to the knockout rod 13 and knockout pin 12. This latter pin thus ejects the blank from the die 11 in timed relation with the other parts of the header or upsetting machine. An adjustable stop 49 limits the movement of the lever 15 in the reverse direction.

Within the scope of the appended claims modifications and alterations may be made in the detailed construction of my improved mechanism and I would therefore have it understood that I do not limit myself to the exact construction herein shown and described.

What I claim as new and desire to secure by Letters Patent, is:—

1. In mechanism of the character described; companion cams rotatable about a common axis, companion rock members rotatable about a common axis, each of said rock members having a part thereon upon one side of their common axis in contact with one of said cams; and yielding means between said rock members upon the opposite side of said common axis, whereby said rock members are moved relatively to each other.

2. In mechanism of the character described; companion cams rotatable about a common axis; companion rock members rotatable about a common axis and independently of each other, each of the rock members having a part thereon in contact with one of said cams; a plunger mounted in one of the rock members; a yielding member that applies pressure to the plunger and holds the same in contact with the other rock member and by reason thereof causes the rock members to move upon their common axis; and means for varying the tension of said yielding member, the relative positions of the rock members about their axis when under the influence of the pressure means being limited only by said cams.

3. In mechanism of the character described; companion cams rotatable about a common axis; companion rock members rotatable about a common axis and each having a face thereon substantially parallel with said common axis and extending laterally therefrom; a cam roll or the like connected with each of said rock members and each having contact with one of said cams; a member mounted to move freely in one of the rock members at an angle to the said face thereof and in engagement with the corresponding face of the other rock member; and variable pressure means for actuating said member in one direction.

In testimony whereof, I have hereunto affixed my signature.

RICHARD LESTER WILCOX.